United States Patent
Sanger et al.

(10) Patent No.: US 11,530,841 B2
(45) Date of Patent: Dec. 20, 2022

(54) TWO-PORT HYDRODYNAMIC HEATER

(71) Applicants: Jeremy Sanger, Milford, MI (US);
Franco Garavoglia, Walled Lake, MI (US)

(72) Inventors: Jeremy Sanger, Milford, MI (US);
Franco Garavoglia, Walled Lake, MI (US)

(73) Assignee: VENTECH, LLC

( * ) Notice: Subject to any disclaimer, the term of this patent is extended or adjusted under 35 U.S.C. 154(b) by 0 days.

(21) Appl. No.: 16/298,334

(22) Filed: Mar. 11, 2019

(65) Prior Publication Data

US 2020/0348044 A1 Nov. 5, 2020
US 2021/0048222 A9 Feb. 18, 2021

Related U.S. Application Data

(60) Provisional application No. 62/641,322, filed on Mar. 10, 2018.

(51) Int. Cl.
*F04D 29/18* (2006.01)
*F24H 9/20* (2022.01)
(Continued)

(52) U.S. Cl.
CPC .......... *F24H 1/009* (2013.01); *B60H 1/00321* (2013.01); *B60H 1/00328* (2013.01);
(Continued)

(58) Field of Classification Search
CPC ... B60H 2001/146; F04D 29/181; F24H 1/10; F24H 9/2028; F24V 40/00
See application file for complete search history.

(56) References Cited

U.S. PATENT DOCUMENTS 3,989,127 A 11/1976 Staudenmaier
5,090,523 A 2/1992 Vogelsang
(Continued)

FOREIGN PATENT DOCUMENTS

DE 3147468 A1 * 12/1982 ............... F01P 3/20
DE 3147468 A1 * 12/1982
DE 3147468 X 12/1982

OTHER PUBLICATIONS

European Search Report for Application No. EP 19 76 7805.

*Primary Examiner* — Edelmira Bosques
*Assistant Examiner* — Michael James Giordano
(74) *Attorney, Agent, or Firm* — Panagos Kennedy PLLC; Bill C Panagos; Linda D Kennedy (57) ABSTRACT

A hydrodynamic heater includes an inlet port for receiving a stream of fluid from an external source and an outlet port for discharging a stream of heated fluid from the hydrodynamic heater. A hydrodynamic chamber operates to selectively heat fluid present within an interior region of the hydrodynamic chamber. The hydrodynamic chamber includes an inlet port and an outlet port located along an interior wall of the hydrodynamic chamber. The hydrodynamic chamber inlet port is fluidly connected to the inlet port of the hydrodynamic heater. The hydrodynamic heater includes a fluid metering device having an inlet fluidly connected to the hydrodynamic heater inlet port and an outlet fluidly connected to the inlet port of the hydrodynamic chamber.

8 Claims, 8 Drawing Sheets

(51) Int. Cl.
  *F24V 40/00* (2018.01)
  *F24H 1/10* (2022.01)
  *F24H 1/00* (2022.01)
  *B60H 1/00* (2006.01)
  *B60H 1/02* (2006.01)

(52) U.S. Cl.
  CPC ............ *F04D 29/181* (2013.01); *F24H 1/10* (2013.01); *F24H 9/2007* (2013.01); *F24V 40/00* (2018.05); *B60H 1/02* (2013.01); *F24H 9/2028* (2013.01)

(56) References Cited

U.S. PATENT DOCUMENTS

| | | | | |
|---|---|---|---|---|
| 5,573,184 | A * | 11/1996 | Martin | B60H 1/038 237/12.3 R |
| 9,127,663 | B2 * | 9/2015 | Pegg | F04B 23/00 |
| 2010/0025486 | A1 * | 2/2010 | Sanger | F28D 7/1607 237/1 R |
| 2017/0059207 | A1 * | 3/2017 | Garavoglia | B60H 1/038 |
| 2019/0041095 | A1 * | 2/2019 | Boros | F24H 1/107 |

* cited by examiner

TWO-PORT HYDRODYNAMIC HEATER

RELATED APPLICATIONS

This application claims the benefit of U.S. Provisional Application No. 62/641,322, entitled Two-Port Hydrodynamic heater, filed on Mar. 10, 2018, which is herein incorporated by reference in its entirety.

BACKGROUND

Conventional automotive vehicles typically include a heating system for supplying warm air to a passenger compartment of the vehicle. The heating system includes a control system that allows a vehicle operator to regulate the quantity and/or temperature of air delivered to the passenger compartment to achieve a desirable air temperature within the passenger compartment. Cooling fluid from the vehicle's engine cooling system is commonly used as a source of heat for heating the air delivered to the passenger compartment.

The heating system typically includes a heat exchanger fluidly connected to the vehicle's engine cooling system. Warm cooling fluid from the engine cooling system passes through the heat exchanger and gives up heat to a cool air supply flowing through the heating system. The heat energy transferred from the warm cooling fluid to the cool air supply causes the temperature of the air to rise. The heated air is discharged into the passenger compartment to warm the interior of the vehicle to a desired air temperature.

The vehicle's engine cooling system provides a convenient source of heat for heating the vehicle's passenger compartment. One disadvantage of using the engine cooling fluid as a heat source, however, is that there is typically a significant delay between when the vehicle's engine is first started and when the heating system begins supplying air at a preferred temperature. This is particularly true when the vehicle is operated in very cold ambient conditions or has sat idle for a period of time. The delay is due to the cooling fluid being at substantially the same temperature as the air flowing through the heating system and into the passenger compartment when the engine is first started. As the engine continues to operate, a portion of the heat generated as a byproduct of combusting a mixture of fuel and air in the engine cylinders is transferred to the cooling fluid, causing the temperature of the cooling fluid to rise. Since, the temperature of the air being discharged from the heating system is a function of the temperature of the cooling fluid passing through the heat exchanger, the heating system will produce proportionally less heat while the engine cooling fluid is warming up than when the cooling fluid is at a preferred operating temperature. Thus, there may be an extended time between when the vehicle's engine is first started and when the heating system begins producing air at an acceptable temperature level. The time it takes for this to occur will vary depending on various factors, including the initial temperature of the cooling fluid and the initial temperature of the air being heated. It is preferable that the temperature of the cooling fluid reach its preferred operating temperature as quickly as possible.

Another potential limitation of using the engine cooling fluid as a heat source for the vehicle's heating system is that under certain operating conditions the engine may not be rejecting enough heat to the cooling fluid to enable the air stream from the vehicle's heating system to achieve a desired temperature. This may occur, for example, when operating a vehicle with a very efficient engine under a low load condition or in conditions where the outside ambient temperature is unusually cold. Both of these conditions reduce the amount of heat that needs to be transferred from the engine to the cooling fluid to maintain a desired engine operating temperature. This results in less heat energy available for heating the air flowing through the vehicle's heating system.

Accordingly, it is desirable to develop a heating system capable of intermittently providing additional heating of an engine's cooling fluid to improve the heating efficiency of the vehicles' passenger compartment heating system.

SUMMARY

Disclosed is hydrodynamic heater operable for generating a stream of heated fluid. The hydrodynamic heater includes an inlet port for receiving a stream of fluid from an external source and an outlet port for discharging a stream of heated fluid from the hydrodynamic heater. The hydrodynamic heater includes a stator and a rotor positioned adjacent the stator. The stator and rotor together define a hydrodynamic chamber operable for heating a fluid. The rotor is mounted to a drive shaft and rotatable relative to the stator. The hydrodynamic chamber operates to heat fluid present within an interior of the hydrodynamic chamber. The hydrodynamic chamber includes an inlet port located proximate a center of the interior region of the hydrodynamic chamber and an outlet port located along an interior wall of the hydrodynamic chamber. The hydrodynamic chamber inlet port is fluidly connected to the inlet port of the hydrodynamic heater. A fluid bypass passage may be fluidly connected to both the inlet and outlet ports of the hydrodynamic chamber. An inlet fluid metering device may be connected in series with the fluid bypass passage and the inlet port of the hydrodynamic chamber. Heated fluid from the hydrodynamic chamber may be discharged from the outlet port of the hydrodynamic heater to the fluid bypass passage. An outlet fluid metering device may be connected in series with the fluid bypass passage and the outlet port of the hydrodynamic chamber. Power for rotating the drive shaft and rotor relative to the stator may be provided by an external power source.

BRIEF DESCRIPTION OF THE DRAWINGS

The description herein makes reference to the accompanying drawings wherein like reference numerals refer to like parts throughout the several views, and wherein.

DETAILED DESCRIPTION

Referring now to the discussion that follows, and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Disclosed is a two-port hydrodynamic heater operable to selectively generate a stream of heated fluid. The hydrodynamic heater may be employed with a variety of systems requiring a source of heat. For example, the hydrodynamic heater may be incorporated into an automotive engine cooling system to provide primary or supplemental heat for heating a passenger compartment of a vehicle and/or provide other functions, such as windshield deicing. The hydrodynamic heater may be used in a wide variety of applications that utilize a heat source. Heated fluid discharged from the hydrodynamic heater may be used directly or in conjunction with one or more heat exchangers to provide a stream of heated fluid, such as stream of air. The hydrodynamic heater may function as a primary source of heat or operate to supplement heat provide by another heat source.

With reference to FIGS. 1-4, a two-port hydrodynamic heater 30 may include a generally toroidal-shaped hydrodynamic chamber 32 operable for heating a fluid present within the hydrodynamic chamber. Hydrodynamic chamber 32 may be enclosed within a housing 34. The two-port hydrodynamic heater 30 may include an inlet passage 38 having an inlet port 40 and an outlet passage 42 having an outlet port 44. Inlet passage 38 fluidly connects hydrodynamic chamber 32 to an external fluid source and outlet passage 42 provides a fluid outlet for outputting a stream of heated fluid generated when operating the two-port hydrodynamic heater 30.

Figure 1:
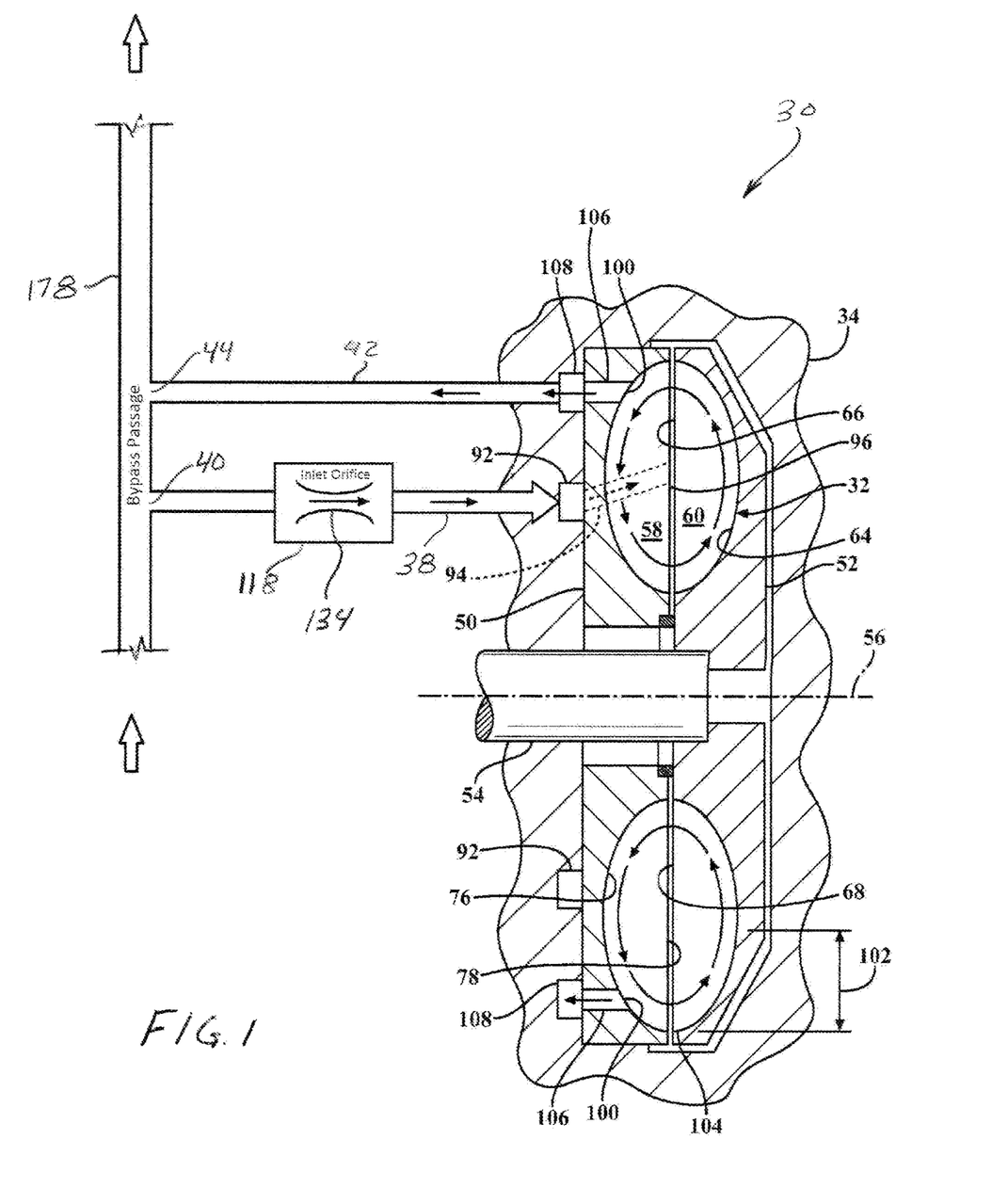
FIG. 1 is schematic partial cross-sectional view of a two-port hydrodynamic heater employing an inlet fluid metering device, the two-port hydrodynamic heater fluidly connected in parallel to a fluid bypass passage.

The hydrodynamic chamber 32 may include a stator 50 and a coaxially aligned rotor 52 positioned adjacent stator 50. Stator 50 may be fixedly attached to housing 34. Rotor 52 may be mounted on a drive shaft 54 for concurrent rotation therewith about an axis of rotation 56 relative to the stator 50 and housing 34. Stator 50 and rotor 52 may each include an annular cavity 58 and 60, respectively, which together define hydrodynamic chamber 32.

Figure 2:
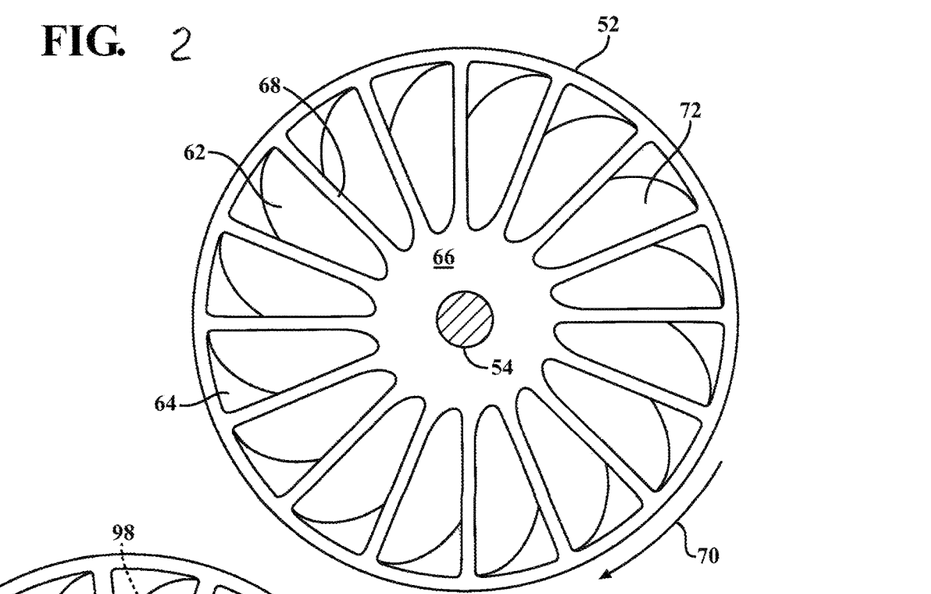
FIG. 2 is a schematic front view of a rotor that partially defines a hydrodynamic chamber of the hydrodynamic heater.

With reference to FIGS. 1 and 2, rotor 52 may include a plurality of rotor blades 62 arranged circumferentially within annular cavity 60 of rotor 52. Rotor blades 62 extend generally radially outward relative to the axis of rotation 56 and extend axially inward (i.e., toward a center of hydrodynamic chamber 32) from an interior back wall 64 of rotor 52 to a front face 66 of rotor 52 located immediately adjacent stator 50. Each rotor blade 62 includes a leading edge 68 located adjacent stator 50. Rotor blades 62 may be inclined in direction opposite a direction of rotation 70 of rotor 52 from leading edge 68 to interior back wall 64 of rotor 52. Rotor blades 62 and interior back wall 64 together define a plurality of bucket-shaped rotor cavities 72 circumferentially distributed within annular cavity 60 of the rotor 52.

Figure 3:
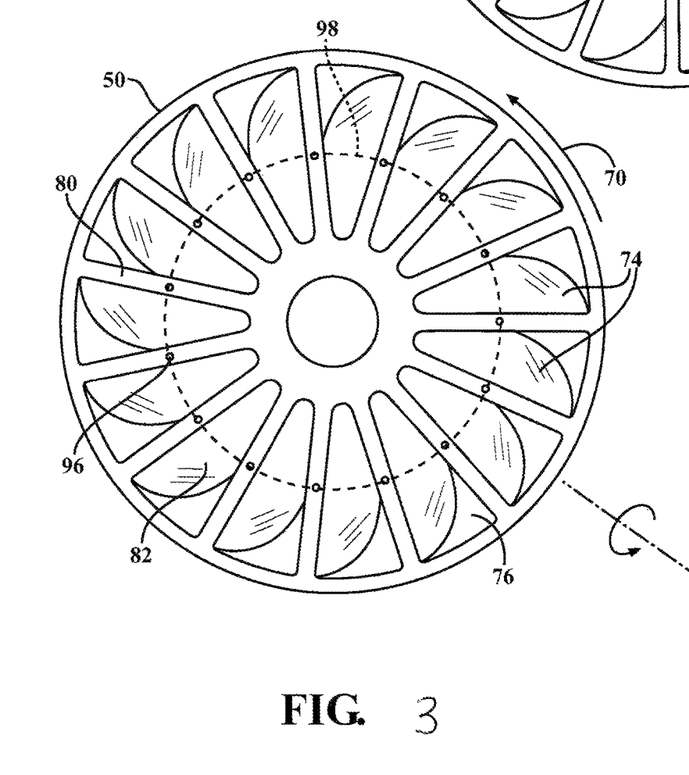
FIG. 3 is a schematic front view of a stator that partially defines the hydrodynamic chamber.

With Reference to FIGS. 1 and 3, stator 50 may include a plurality of stator vanes 74 arranged circumferentially within annular cavity 58 of stator 50. Stator vanes 74 extend generally radially outward relative to the axis of rotation 56 and extend axially inward (i.e., toward a center of hydrodynamic chamber 32) from an interior back wall 76 of the stator 50 to a front face 78 of stator 50 located immediately adjacent rotor 52. Each stator vane 74 includes a leading edge 80 located adjacent rotor 52. Stator vanes 50 may be inclined in the direction of rotation 70 of rotor 50 from leading edge 80 to the interior back wall 76 of stator 50. Stator vanes 74 and the interior back wall 76 of the stator 50 together define a plurality of bucket-shaped stator cavities 82 circumferentially distributed within annular cavity 58 of stator 50.

Power for rotatably driving rotor 52 when the two-port hydrodynamic heater 30 is activated may be supplied by an external power source, for example, an internal combustion engine or electric motor. With reference to FIG. 1, an end of drive shaft 54 may extend from housing 34 of the two-port hydrodynamic heater 30. Drive shaft 54 may be coupled, for example, to an engine accessory drive belt driven by a crankshaft of the vehicle's engine. The accessory drive belt transfers torque generated by the vehicle engine to drive shaft 54 connected to rotor 52.

With continued reference to FIGS. 1-4, inlet passage 38 fluidly connects inlet port 40 to a generally annular-shaped inlet plenum 92. One or more stator supply passages 94 extend through stator vane 74 and fluidly connect inlet plenum 92 to hydrodynamic chamber 32. Stator supply passages 94 exit stator vanes 74 at a hydrodynamic chamber inlet port 96 located proximate leading edge 80 of stator vane 74. Hydrodynamic chamber inlet port 96 may be generally located at or near a toroid axis of revolution 98 of the toroidal-shaped hydrodynamic chamber 32. FIG. 3 illustrates each stator vane 74 as including a supply passage 74 and a hydrodynamic chamber inlet port 96; however, certain applications may employ fewer passages and ports. In certain applications, some of the stator vanes 74 may include supply passage 94 and hydrodynamic chamber inlet port 96, while other stator vanes 74 may not. The total number of stator supply passages 94 and hydrodynamic chamber inlet ports 96 may vary depending on the design and performance requirements of a particular application.

Figure 4:
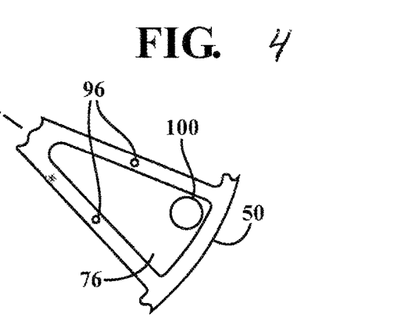
FIG. 4 is a schematic partial view of a stator cavity of the stator.

With reference to FIGS. 1 and 4, hydrodynamic chamber 32 may include a hydrodynamic chamber outlet port 100 located along interior back wall 76 of stator 50. The hydrodynamic chamber outlet port 100 may be positioned within an outermost half 102 of hydrodynamic chamber 32 generally extending from the toroid axis of revolution 98 to an outer circumference 104 of hydrodynamic chamber 32. The hydrodynamic chamber outlet port 100 and the hydrodynamic chamber inlet port 96 may alternatively be located at a different locations along a periphery of the hydrodynamic chamber 32, so long as the hydrodynamic chamber outlet port 100 is located at a radial distance from the axis of rotation 56 that is greater than a radial distance between the hydrodynamic chamber inlet port 96 and the axis of rotation 56.

With particular reference to FIG. 1, a hydrodynamic chamber outlet passage 106 may fluidly connect the hydrodynamic chamber outlet port 100 to a generally annular-shaped outlet plenum 108. Outlet passage 42 may fluidly connect outlet plenum 108 to outlet port 44.

Inlet passage 38 may include an inlet fluid metering device 118 for controlling a flow rate of fluid passing through inlet passage 38 from inlet port 40 to inlet plenum 92. Inlet fluid metering device 118 operates to control a flowrate of fluid from inlet port 40 to hydrodynamic chamber 32.

Inlet fluid metering device 118 may have any of a variety of configurations. For example, inlet fluid meter device 118 may include an inlet metering orifice 134 having a predetermined configuration based on the design and performance requirements of the particular application. Inlet metering orifice 134 may include a generally fixed fluid thru-flow area that remains open to allow a continuous flow of fluid from inlet port 40 to hydrodynamic chamber 32. Inlet metering orifice 134 may include, for example, an orifice plate or any other device capable of restricting a flow of fluid between inlet port 40 and hydrodynamic chamber 32.

It should be understood that FIG. 1 merely illustrates an example of a fluid passage network that may be used to fluidly interconnect hydrodynamic chamber 32, fluid metering device 118 and inlet and outlet ports 40 and 44. Other alternately configured fluid networks may also be employed depending on the performance and design requirements of a particular application. Various fluid passages and/or combinations of fluid passages may be used to fluidly connect inlet port 40 to inlet fluid metering device 118 and inlet fluid metering device 118 to hydrodynamic chamber inlet port 96. Any such alternately configured fluid network may be arranged within or separate from housing 34. Regardless of the actual configuration of the fluid network employed, the fluid network passages should operate to fluidly connect inlet fluid metering device 118 in series with inlet port 40 and hydrodynamic chamber 32.

The two-port hydrodynamic heater 30 may be integrated into a selected application by fluidly connecting inlet passage 38 and outlet passage 42 to a common external fluid source, such as, for example, an inlet heater hose 178. Fluid entering the two-port hydrodynamic heater 30 from the external fluid source through inlet passage 38 may be heated and discharged from the two-port hydrodynamic heater 30 through outlet passage 42. Suitable hoses, pipes, tubes and various other fluid connections may be used to fluidly connect inlet port 40 and outlet port 44 to the associated components employed in the particular application.

When operating the two-port hydrodynamic heater 30, fluid from the external fluid source (i.e., inlet heater hose 178) may enter the two-port hydrodynamic heater 30 at inlet port 40 and travel sequentially through inlet passage 38, fluid metering device 118, inlet plenum 92 and stator supply passage 94 to be discharged into hydrodynamic chamber 32 through hydrodynamic chamber inlet port 96. Fluid present within hydrodynamic chamber 32 travels along a generally toroidal path in hydrodynamic chamber 32, generating heat as the fluid travels back and forth between annular cavities 58 and 60 of stator 50 and rotor 52, respectively. Fluid present in hydrodynamic chamber 32 continues to travel along the path between rotor 52 and stator 50 until being discharged from hydrodynamic chamber 32 through hydrodynamic outlet port 100. The heated fluid passes through hydrodynamic chamber outlet passage 106 to outlet plenum 108. Heated fluid exits outlet plenum 108 and passes through outlet passage 42 to outlet port 44, where it may be discharged to the external fluid source (i.e., inlet heater hose 178).

Performance of the two-port hydrodynamic heater 30 may be at least partially regulated by controlling the flow of fluid being heated in hydrodynamic chamber 32 and discharged through outlet port 44. This may be accomplished by controlling the flow of fluid passing though inlet fluid metering device 118 from inlet port 40 to inlet plenum 92. Increasing a thru-flow area of inlet metering orifice 134 of fluid metering device 118 will typically increase the amount fluid delivered to hydrodynamic chamber 32, whereas decreasing the thru-flow will typically decrease the flowrate. The quantity of fluid passing through inlet fluid metering device 118 may depend in part on the configuration of inlet metering orifice 134 and the pressure drop occurring across fluid metering device 118.

Figure 5:
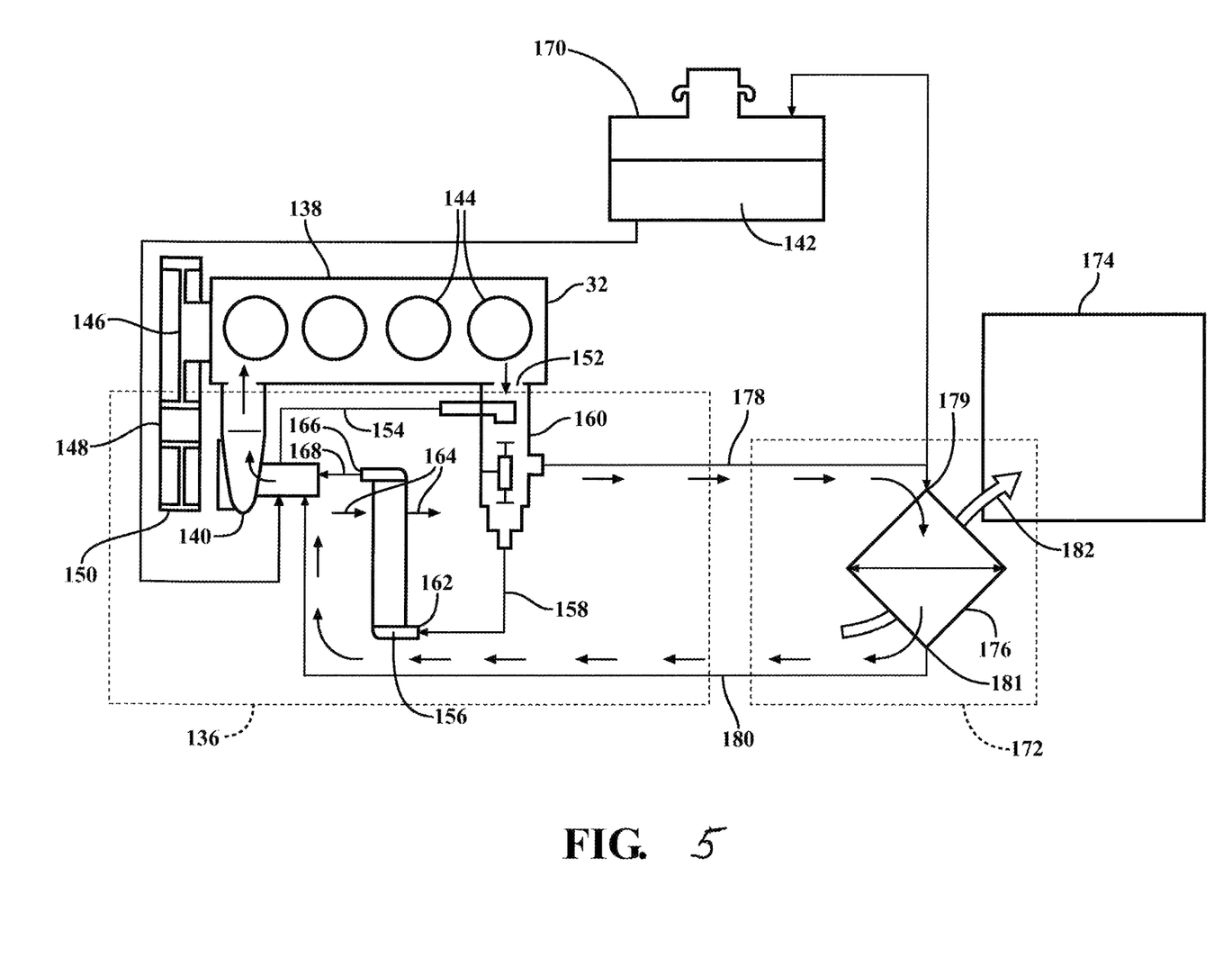
FIG. 5 is a schematic illustration of an automotive engine cooling system.

The two-port hydrodynamic heater 30 may be employed in a wide variety of applications to provide a supply of heat required for the particular application. For example, the two-port hydrodynamic heater 30 may be incorporated with an automotive vehicle cooling system to provide heat for warming a passenger compartment of the vehicle and to provide other capabilities, such as window deicing and engine cooling. An example of a typical automotive cooling system 136 is schematically illustrated in FIG. 5. Vehicle cooling system 136 functions to regulate an operating temperature of an engine 138. Cooling system 136 may include a water pump 140 operable to circulate a cooling fluid 142 through engine 138 to absorb excess heat produced by engine 138. The excess heat is a byproduct of combusting a mixture of fuel and air in cylinders 144 of engine 138 to produce usable mechanical work for propelling the vehicle. Water pump 140 may be powered by an engine accessory drive 146 by way of a drive belt 148 that engages a sheave 150 attached to water pump 140. Accessory drive 146 may be connected to a crankshaft (not shown) of engine 138. The cooling fluid 142 may be circulated through passages in engine 138 where the cooling fluid 142 absorbs at least some of the excess heat. After circulating through engine 138, the cooling fluid 142 may be discharged from engine 138 through an exit passage 152. Depending on the temperature of the cooling fluid 142 exiting engine 138, the cooling fluid may be directed back to water pump 140 through a bypass line 154 to be recirculated through engine 138, or may be directed to a radiator 156 through a fluid line 158.

A thermostat 160 operates to control distribution of the cooling fluid 142 between bypass line 154 and fluid line 158. Thermostat 160 may be configured as a thermally activated valve capable of automatically adjusting its thru-flow area depending on a temperature of the cooling fluid 142 discharged from engine 138 through exit passage 152. An automotive thermostat is one example of thermally activate valve. Automotive thermostats may be calibrated to begin opening at a predetermined cooling fluid temperature (measured within thermostat 160), for example 190 degree Fahrenheit. At cooling fluid temperatures below the calibrated temperature, thermostat 160 may be fully closed to prevent cooling fluid from being supplied to radiator 156 through fluid line 158. At temperatures at or slightly above the calibrated temperature, thermostat 160 begins opening to allow a portion of cooling fluid 142 from engine 138 to be directed to radiator 156. At cooling fluid temperatures significantly higher than the calibrated temperature, thermostat 160 will be completely open to maximize the flow rate of cooling fluid 142 to radiator 156 for a particular vehicle operating condition.

Cooling fluid 142 passing through fluid line 158 enters radiator 156 through an inlet port 162. Cooling fluid 142 flows through radiator 156 where the fluid rejects a portion of its heat to a stream of ambient air 164 flowing across radiator 156. Cooling fluid 142 exits radiator 156 through an outlet port 166 at a lower temperature than the temperature of the cooling fluid entering radiator 156 at inlet port 162. Upon exiting radiator 156 at outlet port 166, cooling fluid 142 is directed to water pump 140 through a fluid line 168.

An expansion tank 170 may be fluidly connected to water pump 140. Expansion tank 170 provides a reservoir for capturing cooling fluid 142 discharged from cooling system 136 as the cooling fluid is heated, such as may occur when engine 138 is started after being turned off for a period of time. A portion of the excess cooling fluid 142 may also be withdrawn from expansion tank 170 and returned back to cooling system 136 when the temperature of the cooling fluid within cooling system 136 is decreased, such as may occur after engine 138 is turned off.

Conventional automotive vehicles may include a heating system 172 for providing a supply of warm air to heat a passenger compartment 174 of the vehicle. Heating system 172 may include a heat exchanger 176, also known as a heater core, fluidly connected to cooling system 136 through inlet heater hose 178 and exit heater hose 180. Inlet heater hose 178 may be fluidly connected to cooling system 136 through thermostat 160 and to heat exchanger 176 at in inlet port 179. Exit heater hose 180 may be fluidly connected to an outlet port 181 of heat exchanger 176 and to water pump 140. A portion of cooling fluid 142 exiting engine 138 at exit passage 152 passes through inlet heater hose 178 to heat exchanger 176. Cooling fluid 142 rejects a portion of its heat to a stream of air 182 made to flow over heat exchanger 176. Airstream 182 may include air drawn from outside the vehicle, from the passenger compartment 174 of the vehicle, or a combination thereof. Airstream 182 exits heat exchanger 176 at a higher temperature than when it entered. The warm airstream 182 may be discharged into passenger compartment 174 to warm the interior of the vehicle. The warm airstream 182 may also be directed to flow over an interior glass surface of the vehicle to remove frost or condensation that may have formed on the glass surface. Heating system 172 may also include various control devices for regulating a temperature and flow rate of airstream 182 being supplied to passenger compartment 174.

Figure 6:
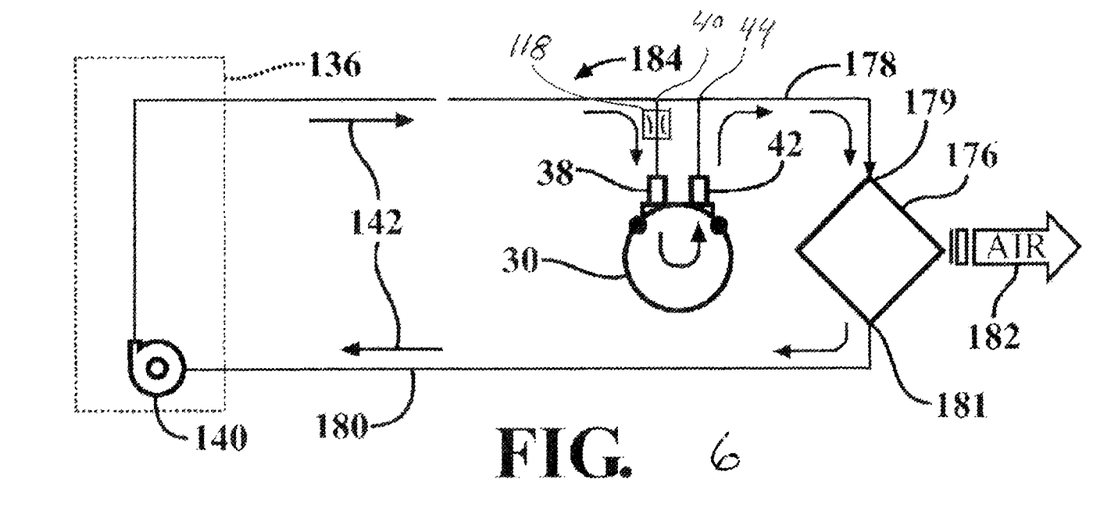
FIG. 6 is a schematic illustration of a heating system incorporating the two-port hydrodynamic heater of FIG. 1, employed with the automotive cooling system of FIG. 5.

Referring to FIG. 6, a heating system 184 may include the two-port hydrodynamic heater 30 fluidly connected in parallel with inlet heater hose 178. With this arrangement, a portion of the cooling fluid 142 received from cooling system 136 passes through the two-port hydrodynamic heater 30 prior to being delivered to heat exchanger 176. Inlet passage 38 of the two-port hydrodynamic heater 30 may be fluidly connected to the inlet heater hose 178 at inlet port 40 and the outlet passage 42 may be fluidly connected to inlet heater hose 178 at outlet port 44.

Inlet heater hose 178 fluidly connects inlet passage 38 and outlet passage 42 of the two-port hydrodynamic heater 30 to the vehicle cooling system 136 and inlet port 179 of heat exchanger 176. Outlet port 181 of heat exchanger 176 may be fluidly connected to vehicle cooling system 136 and water pump 140 through exit heater hose 180. Vehicle water pump 140 may be used to supply pressurized cooling fluid 142 to the two-port hydrodynamic heater 30 to maintain the fluid level within the two-port hydrodynamic heater 30 at desired level.

Activating the two-port hydrodynamic heater 30 (i.e., causing rotor 52 to rotate relative to stator 50) causes pressurized cooling fluid 142 from water pump 140 of vehicle cooling system 136 to enter the two-port hydrodynamic heater 30 from inlet heater hose 178 through inlet passage 38. The cooling fluid 142 is heated by the two-port hydrodynamic heater 30 in the manner previously described and discharged through outlet passage 42 to inlet heater hose 178. The heated cooling fluid 142 may be delivered to heat exchanger 176 at inlet port 179. Heat from the cooling fluid 142 is transferred to airstream 182 as the cooling fluid 142 passes through the heat exchanger. The cooling fluid 142 is discharged from outlet port 181 of the heat exchanger 176 into exit heater hose 180 and returned to the vehicle cooling system 136 and water pump 140.

Figure 7:
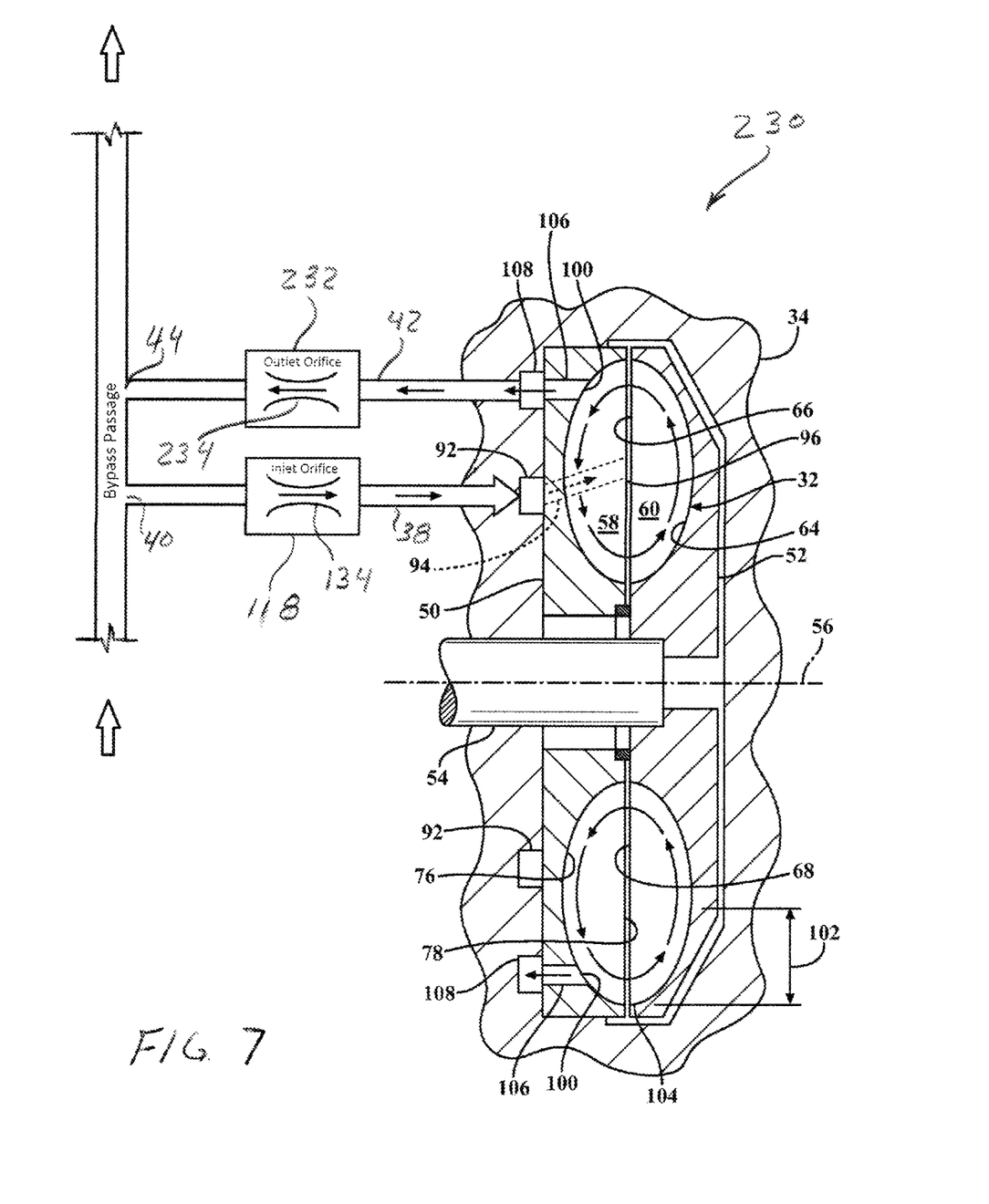
FIG. 7 is a schematic illustration of an alternately configured two-port hydrodynamic heater employing an inlet fluid metering device and an outlet fluid metering device, the two-port hydrodynamic heater connected in parallel to the fluid bypass passage.

With reference to FIG. 7, an alternately configured two-port hydrodynamic heater 230 may include an outlet metering device 232 fluidly integrated into outlet passage 42. The two-port hydrodynamic heater 230 is otherwise configured substantially similar to the two-port hydrodynamic heater 30. Outlet fluid metering device 232 operates in conjunction with inlet metering device 118 to control the amount of fluid passing through hydrodynamic chamber 32.

Outlet fluid metering device 232 may have any of a variety of configurations. For example, outlet fluid metering device 232 may include an outlet metering orifice 234 having a predetermined configuration based on the design and performance requirements of the particular application. Outlet metering orifice 234 may include a generally fixed fluid thru-flow area that remains open to allow a continuous flow of fluid from hydrodynamic chamber 32 to outlet port 44. Outlet metering orifice 234 may include, for example, an orifice plate or any other device capable of restricting a flow of fluid between hydrodynamic chamber 32 and outlet port 44.

The two-port hydrodynamic heater 230 may be integrated into a selected application in a similar manner as previously described in connection with the two-port hydrodynamic heater 30. For example, inlet passage 38 and outlet passage 42 may be fluidly connected to a common external fluid source, such as, for example, inlet heater hose 178. When operating the two-port hydrodynamic heater 230, fluid from the external fluid source (i.e., inlet heater hose 178) may enter the two-port hydrodynamic heater 230 at inlet port 40 and travel sequentially through inlet passage 38, fluid metering device 118, inlet plenum 92 and stator supply passage 94 to be discharged into hydrodynamic chamber 32 through hydrodynamic chamber inlet port 96. Heated fluid discharged from hydrodynamic chamber 32 passes through hydrodynamic chamber outlet passage 106 to outlet plenum 108. Heated fluid exits outlet plenum 108 and passes through outlet metering device 232 in outlet passage 42 to outlet port 44, where it may be discharged to the external fluid source (i.e., inlet heater hose 178).

Performance of the two-port hydrodynamic heater 230 may be at least partially regulated by controlling the flow of fluid being heated in hydrodynamic chamber 32 and discharged through outlet port 44 of the two-port hydrodynamic heater 230. This may be accomplished by controlling the flow of fluid passing though inlet fluid metering device 118 outlet fluid metering device 232. The thru-flow area of inlet metering orifice 134 and/or outlet metering orifice 234 may be selected to achieve a desired flowrate through hydrodynamic chamber 32. The quantity of fluid passing through hydrodynamic chamber 32 may depend in part on the configuration of inlet metering orifice 134 and/or outlet metering orifice 234 and the pressure drop occurring across the respective fluid metering devices 118 and 232.

Figure 8:
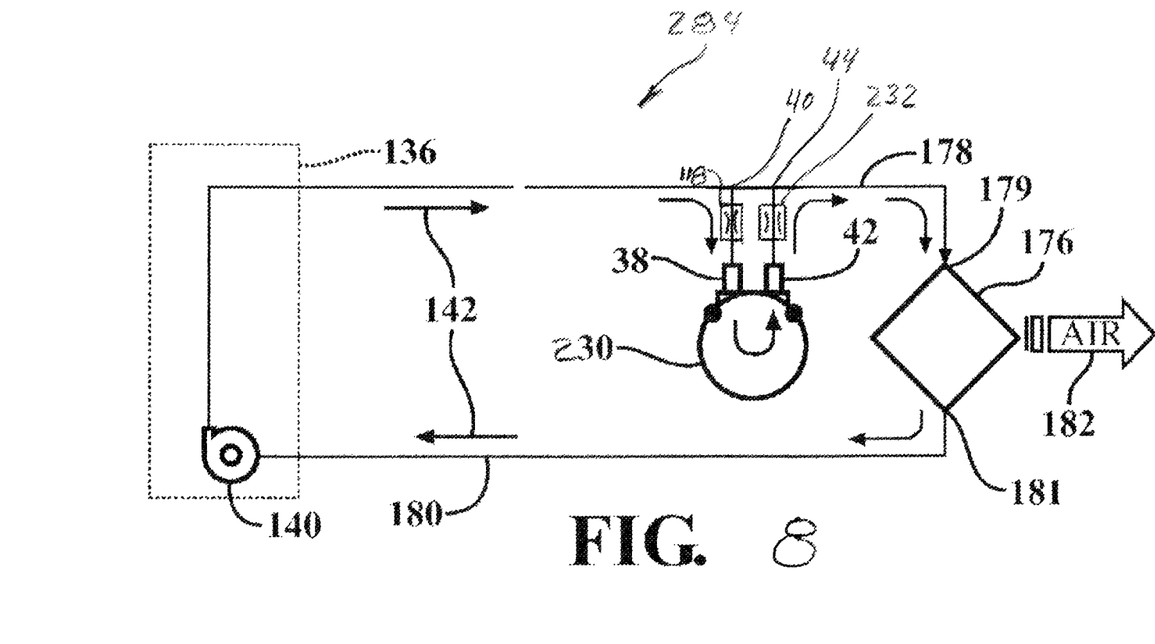
FIG. 8 is a schematic illustration of a heating system incorporating the two-port hydrodynamic heater of FIG. 7, employed with the automotive cooling system of FIG. 5.

Referring to FIG. 8, a heating system 284 may include the two-port hydrodynamic heater 230 fluidly connected in parallel with inlet heater hose 178. With this arrangement, a portion of the cooling fluid 142 received from cooling system 136 passes through the two port hydrodynamic heater 230 prior to being delivered to heat exchanger 176. Inlet passage 38 of the two-port hydrodynamic heater 230 may be fluidly connected to the inlet heater hose 178 at inlet port 42 and the outlet passage may be fluidly connected at outlet port 44. Inlet heater hose 178 fluidly connects inlet passage 38 and outlet passage 42 of the two-port hydrodynamic heater 230 to the vehicle cooling system 136 and inlet port 179 of heat exchanger 176. Outlet port 181 of heat exchanger 176 may be fluidly connected to vehicle cooling system 136 and water pump 140 through exit heater hose 180. Vehicle water pump 140 may be used to supply pressurized cooling fluid 142 to the two-port hydrodynamic heater 230 to maintain the fluid level within the two-port hydrodynamic heater 230 at desired level.

Activating the two-port hydrodynamic heater 230 (i.e., causing rotor 52 to rotate relative to stator 50) causes pressurized cooling fluid 142 from water pump 140 of vehicle cooling system 136 to enter the two-port hydrodynamic heater 230 through inlet passage 38 from inlet heater hose 178. The cooling fluid 142 is heated by the two-port hydrodynamic heater 230 in the manner previously described and discharged through outlet passage 42 to inlet heater hose 178. The heated cooling fluid 142 may be delivered to heat exchanger 176 at inlet port 179. Heat from the cooling fluid 142 is transferred to airstream 182 as the cooling fluid 142 passes through the heat exchanger. The cooling fluid 142 is discharged from outlet port 181 of the heat exchanger 176 into exit heater hose 180 and returned to the vehicle cooling system 136 and water pump 140.

Figure 9:
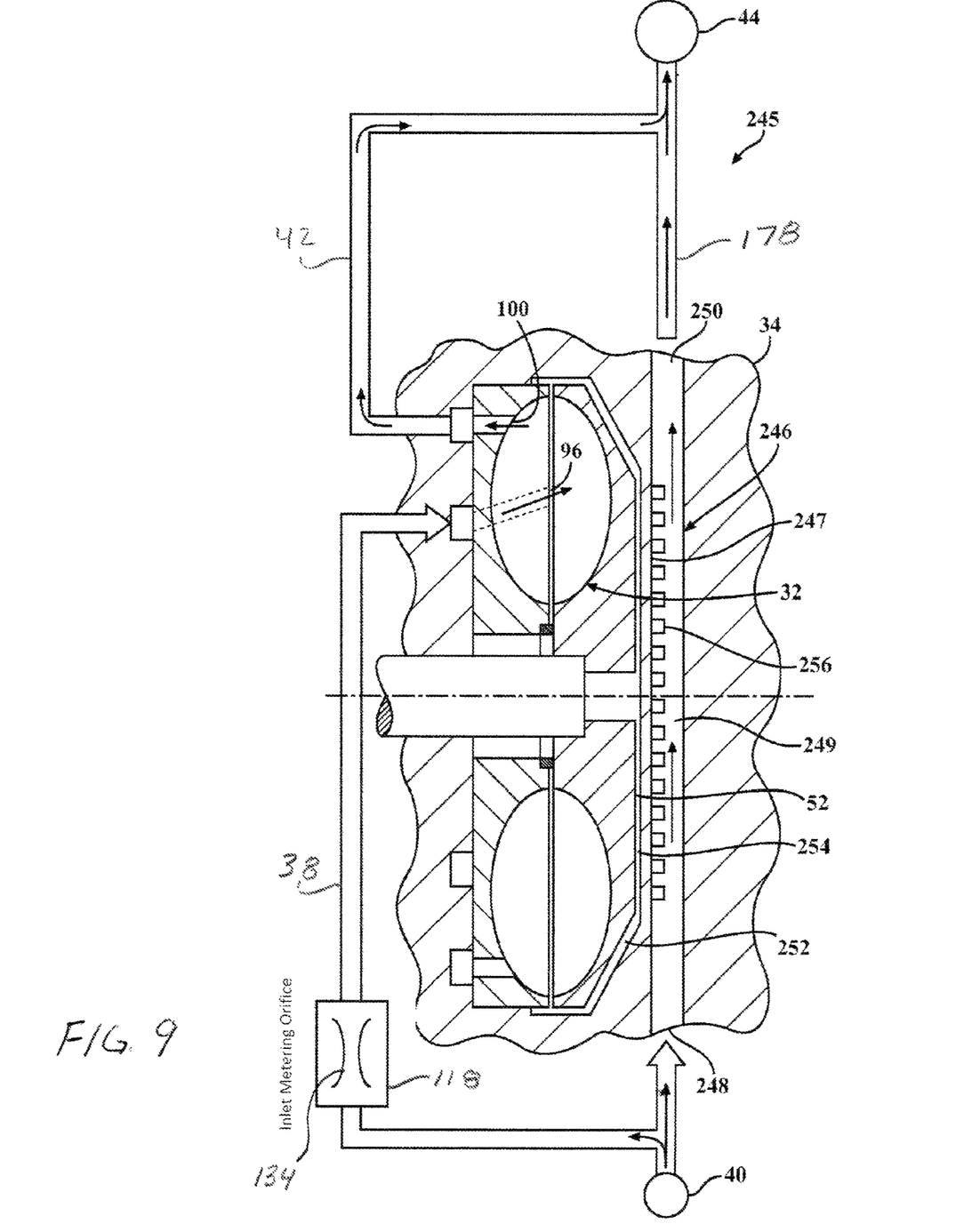
FIG. 9 is a schematic illustration of an alternately configured two-port hydrodynamic heater employing an integrated heat exchanger fluidly connected in parallel to a hydrodynamic chamber of the two-port hydrodynamic heater and employing the inlet fluid metering device.

With reference to FIG. 9, an alternately configured two-port hydrodynamic heater 245 may include an integrated heat exchanger 246 operable for enhancing heat transfer from hydrodynamic chamber 32 to a fluid passing through the two-port hydrodynamic heater 245. The two-port hydrodynamic heater 245 may be configured and operate substantially the same as the two-port hydrodynamic heater 30 with the addition of integrated heat exchanger 246. Heat exchanger 246 may be fluidly connected in parallel with hydrodynamic chamber 32, such that a portion of fluid entering the two-port hydrodynamic heater 245 through inlet port 40 bypasses hydrodynamic chamber 32 and flows through heat exchanger 246. Fluid discharged from heat exchanger 246 may combine with fluid discharged from hydrodynamic chamber 32 prior to exiting the two-port hydrodynamic heater 245 through outlet port 44.

Heat exchanger 246 may be positioned within housing 34 of the two-port hydrodynamic heater 245 adjacent rotor 52. Rotor 52 may be located axially along axis of rotation 56 between stator 50 and heat exchanger 246. A housing wall 247 at least partially defines an interior region 249 of heat exchanger 246 and is positioned between rotor 52 and interior region 249 of heat exchanger 246.

Heat exchanger 246 may include an inlet port 248 fluidly connecting the heat exchanger to inlet port 40 of the two-port hydrodynamic heater 245, and an outlet port 250 fluidly connecting the heat exchanger to outlet port 44 of the two-port hydrodynamic heater 245. Heat generated within hydrodynamic chamber 32 may pass through rotor 52 to fluid present within a cavity 252 located between a back surface 254 of rotor 52 and housing wall 247. In addition, heated fluid discharged from hydrodynamic chamber 32 through an opening 251 between stator 50 and rotor 52 may be carried by the fluid to cavity 252. Heat may pass from the fluid present within cavity 252 through housing wall 247 to heat exchanger 246, where a portion of the heat is transferred to the fluid passing through heat exchanger 246.

A heat transfer effectiveness of heat exchanger 246 may be enhanced by employing various geometric surface features to increase a heat transfer surface area of the heat exchanger and the turbulence of the fluid passing through the heat exchanger. For example, the heat transfer surface area of heat exchanger 246 may be increased by employing a heat transfer surface extender 256, which operates to increase the available surface area for transferring heat to fluid flowing through heat exchanger 246. Heat transfer surface extender 256 may include any of a variety of configurations, including but not limited to, pins, fins and ribs, and may include other surface enhancing configurations designed to enhance heat transfer. The heat transfer surface extenders 256 may also operate to increase turbulence of the fluid passing through the heat exchange, which may in turn increase the heat transfer effectiveness of the heat exchanger.

Upon initiating operation of the two-port hydrodynamic heater 245 (i.e., causing rotor 52 to rotate relative to stator 50), fluid from an external fluid source may enter the two-port hydrodynamic heater 245 at inlet port 40. The fluid is divided after entering inlet port 40, with a portion entering heat exchanger 246 at inlet port 248 and the remaining portion flowing to hydrodynamic chamber 32 through inlet passage 38. The portion of fluid passing through heat exchanger 246 may be discharged through outlet port 250 and flow to outlet port 44 of hydrodynamic heater 245.

Fluid flowing though inlet passage 38 passes through inlet metering orifice 134 of inlet metering device 118 to control the fluid flowrate to hydrodynamic chamber 32. The portion of the fluid directed to hydrodynamic chamber 32 may be discharged into hydrodynamic chamber 32 at hydrodynamic chamber inlet port 96. Heated fluid present within hydrodynamic chamber 32 may be discharged through hydrodynamic outlet port 100 and pass through outlet passage 42. Heated fluid discharged from hydrodynamic chamber 32 may combine with the heated fluid discharged from heat exchanger 246 to be discharged from hydrodynamic heater 245 through outlet port 44.

Figure 10:
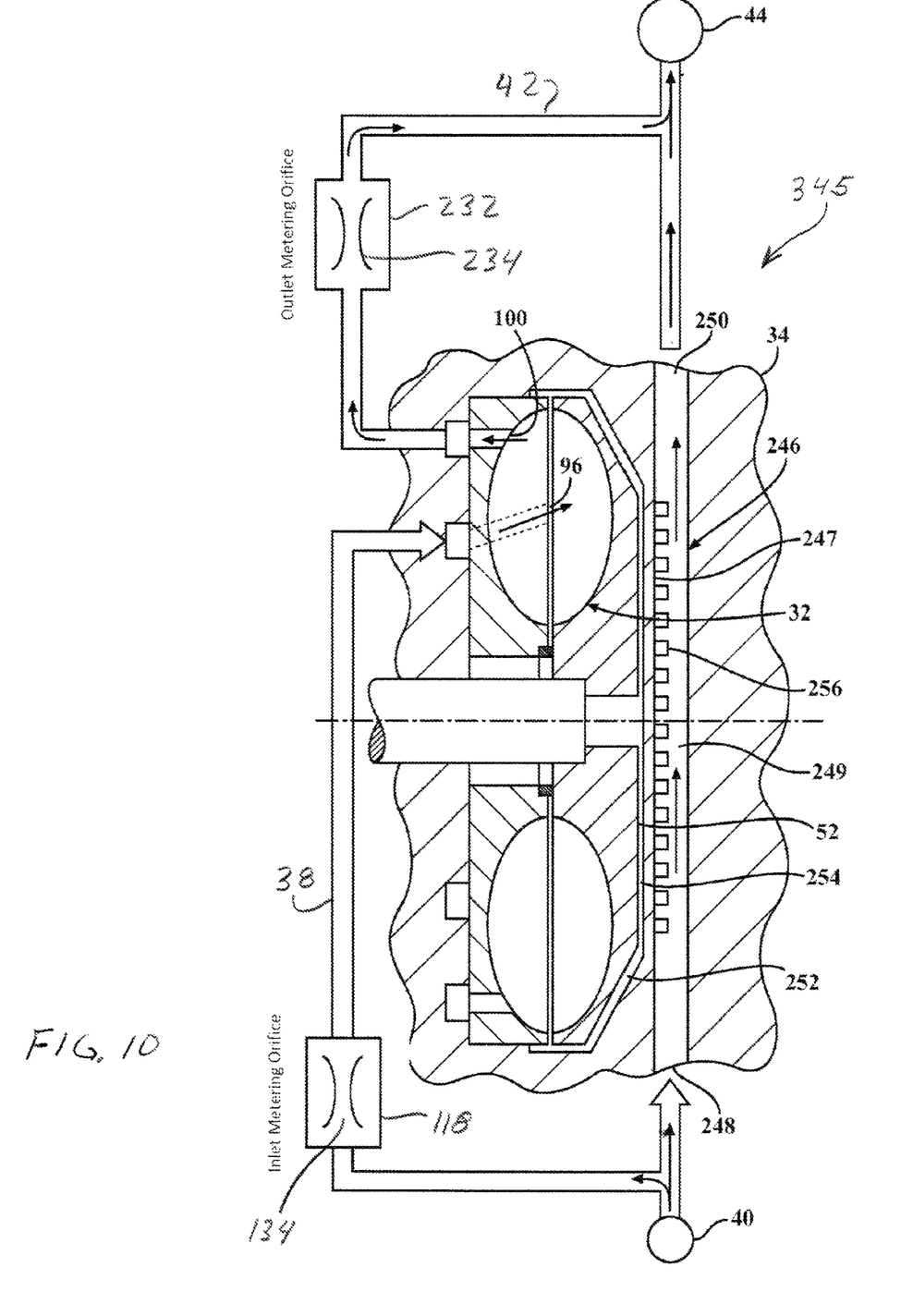
FIG. 10 is a schematic illustration of an alternately configured two-port hydrodynamic heater employing an integrated heat exchanger fluidly connected in parallel to a the hydrodynamic chamber of the two-port hydrodynamic heater and employing the inlet fluid metering device and the outlet fluid metering device.

With reference to FIG. 10, an alternately configured two-port hydrodynamic heater 345 may include the integrated heat exchanger 246 operable for enhancing heat transfer from hydrodynamic chamber 32 to a fluid passing through the two-port hydrodynamic heater 345. The two-port hydrodynamic heater 345 may be configured and operate substantially the same as the two-port hydrodynamic heater 230 with the addition of integrated heat exchanger 246. Heat exchanger 246 may be fluidly connected in parallel with hydrodynamic chamber 32, such that a portion of fluid entering the two-port hydrodynamic heater 345 through inlet port 40 bypasses hydrodynamic chamber 32 and flows through heat exchanger 246. Fluid discharged from heat exchanger 246 combines with the fluid discharged from hydrodynamic chamber 32 prior to exiting the two-port hydrodynamic heater 345 through outlet port 44.

Heat exchanger 246 may be positioned within housing 34 of the two-port hydrodynamic heater 345 adjacent rotor 52. Rotor 52 may be located axially along axis of rotation 56 between stator 50 and heat exchanger 246. A housing wall 247 at least partially defines an interior region 249 of heat exchanger 246 and is positioned between rotor 52 and interior region 249 of heat exchanger 246.

Heat exchanger 246 may include inlet port 248 fluidly connecting the heat exchanger to inlet port 40 of the two-port hydrodynamic heater 345, and outlet port 250 fluidly connecting the heat exchanger to outlet port 44 of the two-port hydrodynamic heater 345. Heat generated within hydrodynamic chamber 32 may pass through rotor 52 to fluid present within a cavity 252 located between a back surface 254 of rotor 52 and housing wall 247. In addition, heated fluid discharged from hydrodynamic chamber 32 through an opening 251 between stator 50 and rotor 52 may be carried by the fluid to cavity 252. Heat may pass from the fluid present within cavity 252 through housing wall 247 to heat exchanger 246, where a portion of the heat is transferred to the fluid passing through heat exchanger 246.

Upon initiating operation of the two-port hydrodynamic heater 345 (i.e., causing rotor 52 to rotate relative to stator 50), fluid from an external fluid source may enter the two-port hydrodynamic heater 345 at inlet port 40. The fluid is divided after entering inlet port 40, with a portion entering heat exchanger 246 at inlet port 248 and the remaining portion flowing to hydrodynamic chamber 32 through inlet passage 38. The portion of fluid passing through heat exchanger 246 may be discharged through outlet port 250 and flow to outlet port 44 of hydrodynamic heater 245.

Fluid flowing though inlet passage 38 passes through inlet metering orifice 134 of inlet metering device 118 to at least partially control the fluid flowrate to hydrodynamic chamber 32. The portion of the fluid directed to hydrodynamic chamber 32 may be discharged into hydrodynamic chamber 32 at hydrodynamic chamber inlet port 96. Heated fluid present within hydrodynamic chamber 32 may be discharged through hydrodynamic outlet port 100 to outlet passage 42, where it passes through metering orifice 234 of outlet metering device 232. Heated fluid discharged from hydrodynamic chamber 32 may combine with the heated fluid discharged from heat exchanger 246 to be discharged from the two-port hydrodynamic heater 345 through outlet port 44.

It is intended that the scope of the present methods and apparatuses be defined by the following claims. However, it must be understood that the disclosed hydrodynamic heater, heating systems and methods of use may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A two-port hydrodynamic heater comprising:
   a hydrodynamic heater having a generally toroidal-shaped hydrodynamic chamber operable for heating a fluid present within the hydrodynamic chamber; said hydrodynamic chamber enclosed within a housing; said two-port hydrodynamic heater including an inlet passage having an inlet port for receiving a stream of fluid from an external source; and an outlet passage having an outlet port operable for discharging a stream of heated fluid from the hydrodynamic heater; said inlet passage fluidly connecting said hydrodynamic chamber to an external fluid source; said outlet passage providing a fluid outlet for outputting a stream of heated fluid generated by the two-port hydrodynamic heater; said hydrodynamic chamber further including a stator fixedly attached to the housing and a coaxially aligned rotor mounted on a drive shaft for concurrent rotation therewith about an axis of rotation relative to the stator and housing; said stator and rotor each include an annular cavity which together define the hydrodynamic chamber; said rotor having a plurality of rotor blades arranged circumferentially within an annular cavity of the rotor; said rotor blades extending generally radially outward relative to the axis of rotation and extend axially inward toward a center of the hydrodynamic chamber from an interior back wall of said rotor to a front face of the rotor located immediately adjacent said stator; said rotor blade having a leading edge located adjacent the stator; the rotor blades inclined in a direction opposite a direction of rotation of the rotor from said leading edge to the interior back wall of the rotor; said rotor blades and interior back wall together define a plurality of bucket-shaped rotors;
   said hydrodynamic heater inlet port in continuous fluid communication with said hydrodynamic outlet port via a bypass passage;
   said hydrodynamic chamber operable to selectively heat a fluid present within an interior region of the hydrodynamic chamber when operating the hydrodynamic heater, and
   an inlet fluid flow metering device having an inlet fluidly connected to the hydrodynamic heater inlet port and an outlet fluidly connected to the hydrodynamic chamber inlet port.

2. The hydrodynamic heater of claim 1, wherein the hydrodynamic chamber outlet port is located a radial distance from the axis of rotation that is greater than a radial distance between the hydrodynamic chamber inlet port and the axis of rotation.

3. The hydrodynamic heater of claim 1, further comprising a heat exchanger located adjacent a back surface of the rotor, a wall of the heat exchanger and the back surface of the rotor at least partially defining a fluid cavity operable to transfer heat from the hydrodynamic chamber to the heat exchanger.

4. The hydrodynamic heater of claim 3, wherein the heat exchanger further includes a heat exchanger inlet port fluidly connected to the hydrodynamic heater inlet port and a heat exchanger outlet port fluidly connected to the hydrodynamic heater outlet port.

5. The hydrodynamic heater of claim 3, wherein the wall of the heat exchanger includes one or more heat transfer enhancing devices.

6. The hydrodynamic heater of claim 1, wherein the metering device includes a fixed fluid thru-flow area that remains substantially open when operating the hydrodynamic chamber.

7. The hydrodynamic heater of claim 1, wherein the hydrodynamic chamber outlet port is located along an interior back wall of the stator.

8. The hydrodynamic heater of claim 1, wherein the fluid metering device is continuously open to allow fluid to pass through the fluid metering device when operating the hydrodynamic chamber.

\* \* \* \* \*